(12) United States Patent
Vejlgaard et al.

(10) Patent No.: US 12,356,289 B2
(45) Date of Patent: Jul. 8, 2025

(54) DEVICE POSITIONING

(71) Applicant: NOKIA TECHNOLOGIES OY, Espoo (FI)

(72) Inventors: Benny Vejlgaard, Gistrup (DK); Johannes Harrebek, Aalborg (DK); Oana-Elena Barbu, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 255 days.

(21) Appl. No.: 17/931,845

(22) Filed: Sep. 13, 2022

(65) Prior Publication Data
US 2023/0084811 A1  Mar. 16, 2023

(30) Foreign Application Priority Data
Sep. 13, 2021  (FI) ........................... 20215961

(51) Int. Cl.
*H04W 4/029* (2018.01)
*H04W 4/02* (2018.01)

(52) U.S. Cl.
CPC ........... *H04W 4/029* (2018.02); *H04W 4/025* (2013.01)

(58) Field of Classification Search
CPC .............................. H04W 4/029; H04W 4/025
USPC ...................................................... 455/456.1
See application file for complete search history.

(56) References Cited

U.S. PATENT DOCUMENTS

| | | | |
|---|---|---|---|
| 9,234,965 B2 | 1/2016 | Venkatraman | |
| 9,374,678 B2 | 6/2016 | Gupta et al. | |
| 9,485,628 B2 | 11/2016 | Lee et al. | |
| 10,627,236 B2 * | 4/2020 | Kubota | G01S 5/0244 |
| 10,704,905 B2 | 7/2020 | Dormody et al. | |
| 10,863,327 B2 * | 12/2020 | Zhu | H04W 4/38 |
| 2010/0130229 A1 * | 5/2010 | Sridhara | G01S 5/10 340/686.1 |
| 2014/0200037 A1 | 7/2014 | Venkatraman et al. | |
| 2020/0120447 A1 | 4/2020 | Ryden et al. | |

FOREIGN PATENT DOCUMENTS

| | | | |
|---|---|---|---|
| WO | WO 2004/114245 A1 | 12/2004 | |
| WO | WO 2012/065184 A2 | 5/2012 | |
| WO | WO-2017109841 A1 * | 6/2017 | ............... A61B 5/11 |
| WO | WO 2017/184040 A1 | 10/2017 | |

OTHER PUBLICATIONS

"3rd Generation Partnership Project; Technical Specification Group Radio Access Network; NR; Physical layer measurements (Release 16)", 3GPP TS 38.215 v16.4.0, (Dec. 2020), 25 pages.

(Continued)

*Primary Examiner* — Qutbuddin Ghulamali
(74) *Attorney, Agent, or Firm* — ALSTON & BIRD LLP

(57) ABSTRACT

Apparatus and methods for apparatus positioning are provided. Solution comprises monitoring relative vertical movement of an apparatus utilising repeated readings of a barometric sensor; comparing monitored relative movement to a given threshold and determining whether the vertical position of the apparatus is changed or unchanged based on the comparison and controlling calculation of the position of the apparatus based on the determination.

18 Claims, 5 Drawing Sheets

(56) References Cited

OTHER PUBLICATIONS

"3rd Generation Partnership Project; Technical Specification Group Services and System Aspects; Service requirements for the 5G system; Stage 1 (Release 18)", 3GPP TS 22.261 v18.3.0, (Jun. 2016), 91 pages.

Bhargava et al., "Locus: Robust and calibration-free indoor localization, tracking and navigation for multi-story buildings," Journal of Location Based Services, vol. 9, No. 3, (Nov. 9, 2015), pp. 187-208.

CATT et al., "New WID on NR Positioning Enhancements", 3GPP TSG RAN Meeting #90e, RP-202900, (Dec. 7-11, 2020), 5 pages.

Ericsson, "Introduction of NR Positioning Support", 3GPP TSG-RAN WG1 Meeting #99, CR 0029, R1-1913661, (Nov. 28-22, 2019), 11 pages.

Intel Corporation et al., "New Wid: Nr Positioning Support", 3GPP TSG RAN Meeting #83, RP-190752, (Mar. 18-21, 2019), 6 pages.

Mide Engineering Solutions, "Air Pressure at Altitude Calculator", Retrieved via the Internet on Apr. 20, 2023, <URL:https://www.mide.com/air-pressure-at-altitude-calculator>, (Jul. 2020), 6 pages.

Muralidharan et al., "Barometric Phone Sensors: More Hype Than Hope!", Proceedings of the 15th Workshop on Mobile Computing Systems and Applications, Article No. 12, (Feb. 2014), 6 pages.

Office Action for Finland Application No. 20215961 dated Apr. 5, 2022, 7 pages.

Peral-Rosado et al., "Floor Detection with Indoor Vertical Positioning in LTE Femtocell Networks", 2015 IEEE Globecom Workshops (GC Wkshps), (Dec. 6-10, 2015), 6 pages.

Qualcomm Incorporated, "New SID on NR Positioning Enhancements", 3GPP TSG RAN Meeting #86, RP-193237, (Dec. 9-12, 2019), 4 pages.

Radu et al., "HiMLoc: Indoor Smartphone Localization via Activity Aware Pedestrian Dead Reckoning with Selective Crowdsourced WiFi Fingerprinting", 2013 International Conference on Indoor Positioning and Indoor Navigation, (Oct. 28-31, 2013), 10 pages.

Wang et al., "Fusion of Barometric Sensors, WLAN Signals and Building Information for 3-D Indoor/Campus Localization", Proceedings of the International Conference on Multisensor Fusion and Integration for Intelligent Systems (MFI 2006), (Sep. 3-6, 2006), 7 pages.

Wang et al., "Indoor Localization in Multi-Floor Environments with Reduced Effort", 2010 IEEE International Conference on Pervasive Computing and Communications (PerCom), March 29-Apr. 2, 2010), 9 pages.

Zhao et al., "HYFI: Hybrid Floor Identification Based on Wireless Fingerprinting and Barometric Pressure", IEEE Transactions on Industrial Informatics, vol. 13, Issue 1, (Feb. 2017), 12 pages.

\* cited by examiner

DEVICE POSITIONING

CROSS-REFERENCE TO RELATED APPLICATIONS

This application claims priority to Finnish Patent Application No. 20215961, filed Sep. 13, 2021, the entire contents of which are incorporated herein by reference.

FIELD

The exemplary and non-limiting embodiments of the invention relate generally to wireless communication systems. Embodiments of the invention relate especially to apparatuses and methods in wireless communication networks.

BACKGROUND

The use of wireless telecommunication systems has been increasing for several years. In many developed countries almost every grown-up and many children as well use a terminal device of a wireless telecommunication system. The wireless telecommunication systems are under constant development. New services are developed, and older services are enhanced.

Positioning services or utilising the location of terminal devices of users are developed as well. The accuracy of the positioning services should be as high as possible, as the location of a terminal device may be utilised not only in commercial services but also in emergency situations.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses. In an example embodiment, an apparatus in a communication system is provided that comprises at least one processor; and at least one memory including computer program code with the at least one memory and computer program code configured to, with the at least one processor, cause the apparatus to monitor relative vertical movement of the apparatus utilizing repeated readings of a barometric sensor. The apparatus is also caused to compare monitored relative movement to a given threshold and determine whether a vertical position of the apparatus is changed or unchanged based on the comparison. The apparatus is further caused to control calculation of the position of the apparatus based on the determination.

In another example embodiment, an apparatus in a network element of a communication system is provided and comprises at least one processor; and at least one memory including computer program code with the at least one memory and computer program code configured to, with the at least one processor, cause the apparatus to receive from a terminal device information on a vertical position of the terminal device. The apparatus is also caused to perform and accumulate cellular positioning measurements regarding the terminal device, if the received information indicates the vertical position of the terminal device is unchanged and when a given number of measurements have been made determine the position of the terminal device.

In a further example embodiment, an apparatus in a communication system is provided that comprises means for monitoring relative vertical movement of the apparatus utilizing repeated readings of a barometric sensor. The apparatus also includes means for comparing monitored relative movement to a given threshold and determining whether a vertical position of the apparatus is changed or unchanged based on the comparison. The apparatus further includes means for controlling calculation of the position of the apparatus based on the determination.

In yet another example embodiment, an apparatus in a network element of a communication system is provided that comprises means for receiving from a terminal device information on a vertical position of the terminal device. The apparatus also comprises means for performing and accumulating cellular positioning measurements regarding the terminal device, if the received information indicates the vertical position of the terminal device is unchanged and when a given number of measurements have been made determining the position of the terminal device.

According to an aspect of the present invention, there are provided communication systems. In an example embodiment, a communication system is provided that comprises an apparatus comprising at least one processor; and at least one memory including computer program code with the at least one memory and computer program code configured to, with the at least one processor, cause the apparatus to monitor relative vertical movement of the apparatus utilising repeated readings of a barometric sensor. The apparatus of the communication system is also caused to compare monitored relative movement to a given threshold and determine whether the vertical position of the apparatus is changed or unchanged based on the comparison. The apparatus of the communication system is further caused to control calculation of the position of the apparatus based on the determination. The communication system also comprises an apparatus in a network element that comprises at least one processor; and at least one memory including computer program code with the at least one memory and computer program code configured to, with the at least one processor, cause the apparatus to receive from a terminal device information on the vertical position of the terminal device. The apparatus in the network element is also caused to perform and accumulate cellular positioning measurements regarding the terminal device, if the received information indicates the vertical position of the terminal device is unchanged and when a given number of measurements have been made determine the position of the terminal device.

In another example embodiment, a communication system is provided that comprises an apparatus comprising means for monitoring relative vertical movement of the apparatus utilizing repeated readings of a barometric sensor. The apparatus of the communication system also comprises means for comparing monitored relative movement to a given threshold and determining whether the vertical position of the apparatus is changed or unchanged based on the comparison. The apparatus of the communication system further comprises means for controlling calculation of the position of the apparatus based on the determination. The communication system also comprises an apparatus in a network element. The apparatus in the network element comprising means for receiving from a terminal device information on the vertical position of the terminal device. The apparatus in the network element also comprising means for performing and accumulating cellular positioning measurements regarding the terminal device, if the received information indicates the vertical position of the terminal device is unchanged and when a given number of measurements have been made determining the position of the terminal device.

According to an aspect of the present invention, there are provided methods. In an example embodiment, a method in an apparatus of a communication system is provided that comprises monitoring relative vertical movement of the apparatus utilizing repeated readings of a barometric sensor. The method also comprises comparing monitored relative movement to a given threshold and determining whether the vertical position of the apparatus is changed or unchanged based on the comparison. The method further comprises controlling calculation of the position of the apparatus based on the determination.

The method in an apparatus of a communication system of another example embodiment is provided that comprises receiving from a terminal device information on the vertical position of the terminal device. The method also comprises performing and accumulating cellular positioning measurements regarding the terminal device, if the received information indicates the vertical position of the terminal device is unchanged and when a given number of measurements have been made determine the position of the terminal device. The method of this example embodiment may also comprise interrupting the accumulating of cellular positioning measurements, resetting values obtained using cellular positioning measurements, and resuming accumulating the measurements from start, if the received information indicates the vertical position of the terminal device is changed.

According to an aspect of the present invention, there are provided computer programs. A computer program of an example embodiment comprises instructions for causing an apparatus to perform at least monitoring relative vertical movement of the apparatus utilising repeated readings of a barometric sensor. The instructions also cause the apparatus to perform comparing monitored relative movement to a given threshold and determining whether a vertical position of the apparatus is changed or unchanged based on the comparison. The instructions further cause the apparatus to perform controlling calculation of the position of the apparatus based on the determination.

A computer program of an example embodiment comprises instructions for causing an apparatus to perform receiving from a terminal device information on a vertical position of the terminal device. The instructions also cause the apparatus to perform and accumulate cellular positioning measurements regarding the terminal device, if the received information indicates the vertical position of the terminal device is unchanged and when a given number of measurements have been made determine the position of the terminal device.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
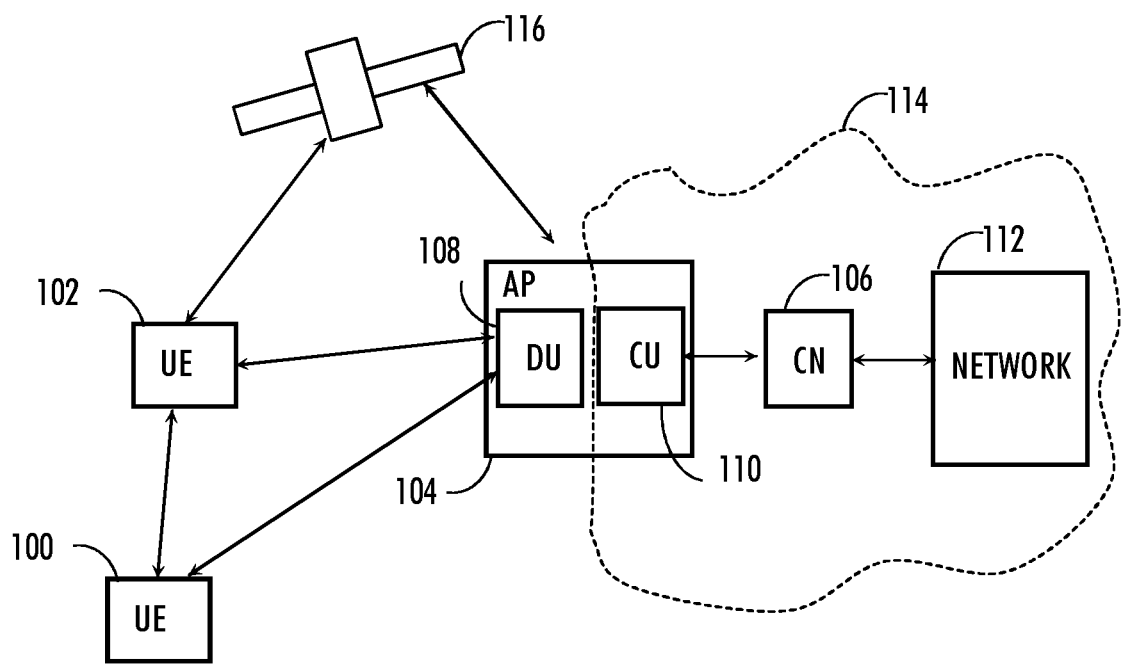

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S–GW+P–GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cm Wave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
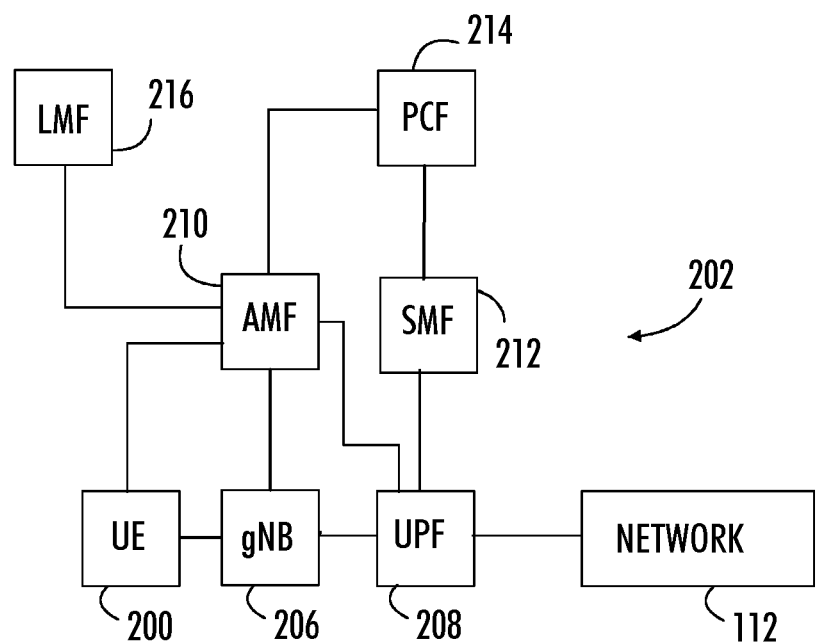

FIG. 2 illustrates an example of a communication system based on 5G network components. A terminal device, user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions. The 5G network may further comprise a location management function, LMF 216, which may be configured to determine the location of the terminal device 200 based on information received from the terminal device and/or gNB 206.

In the development of wireless systems such as NR or 5G, positioning services have been seen as an important feature. Numerous commercial services many utilise position information of terminal devices. Also in emergency situations it may be useful to determine the location of a user carrying a terminal device. In some jurisdictions, wireless communication systems are required to fulfil requirements regarding accuracy of positioning services.

Some positioning solutions have been suggested to be used in NR systems:
   Downlink Time Difference of Arrival (DL-TDOA)
   Uplink Time Difference of Arrival (UL-TDOA)
   Downlink Angle of Departure (DL-AoD)
   Uplink Angle of Arrival (UL-AoA)
   Multi-cell Round Trip Time (Multi-RTT)

The positioning may be performed at the network side, where the network determines the location of a terminal device, or at the terminal device. In the latter case the terminal device performs positioning measurements and determines the location locally. In terminal device-based solutions the location of the gNBs may be sent to the terminal device for use in the location estimation process.

However, present techniques cannot fully fulfil the requirements set for the positioning. Especially this relates to determining vertical position of terminal devices. Most positioning techniques have been so far designed for determining the horizontal location of terminal devices.

To increase accuracy of positioning, long term measurement filtering or averaging may improve the accuracy of the positioning estimation also in vertical direction, but the problem is that for moving users (walking, driving) the position changes frequently and long-term averaging is not always possible.

To obtain information of vertical location of terminal devices, barometric sensors may be included in mobile devices. Pressure measurements using barometric sensors may be utilised to determine the altitude of the terminal device.

Up to an altitude of about 11 km above sea level the air pressure, P, can be expressed by the equation:

$$P = P_b \cdot \left[1 + \frac{L_b}{T_b} \cdot (h - h_b)\right]^{\frac{-g_0 \cdot M}{R \cdot L_b}} \quad (1)$$

From equation 1, the altitude may be estimated as follows:

$$h = h_b + \frac{T_b}{L_b} \cdot \left[\left(\frac{P}{P_b}\right)^{\frac{R \cdot L_b}{-g_0 \cdot M}} - 1\right] \text{ where} \quad (2)$$

$P_b$ = static pressure (pressure at sea level) [Pa]

$T_b$ = standard temperature (temperature at sea level) [K]

$L_b$ = standard temperature lapse rate = −0.0065 [K/m]

$h$ = height above sea level [m]

$h_b$ = height at the bottom of atmospheric layer [m]

$R$ = universal gas constant = 8.31432 $\left[\frac{N \cdot m}{mol \cdot K}\right]$ $g_0$ = gravitational acceleration constant = 9.80665 $\left[\frac{m}{s^2}\right]$ $M$ = molar mass of Earth's air = 0.0289644 [kg/mol]

However, barometer measurements have several sources of error. For example, humidity, temperature, sea level barometric drift and climate control systems in buildings may cause errors in the altitude results obtained using barometric sensors. It has been estimated that the altitude accuracy of barometric sensors is about ±8.5 m (±1 hPa) or worse. Therefore, the use of barometric sensors cannot provide the needed absolute accuracy even if it was calibrated against the outdoor air pressure at sea level.

However, the relative accuracy achievable with barometric sensors is much better and has been estimated to be down to ±1 Pa, at a best case. This corresponds at a building height of 1000 m at hot indoor temperature of 30° C. to be ±11 cm.

In an embodiment, information from one or more barometric sensors of a terminal device is utilized to enhance the accuracy of calculation of the position of the terminal device.

In an embodiment, information from the barometric sensors of a terminal device is utilized to enhance the accuracy of cellular positioning measurements performed by the terminal device.

In an embodiment, information from the barometric sensors of a terminal device is utilized to enhance the accuracy of cellular positioning measurements performed by a network element.

Figure 3:
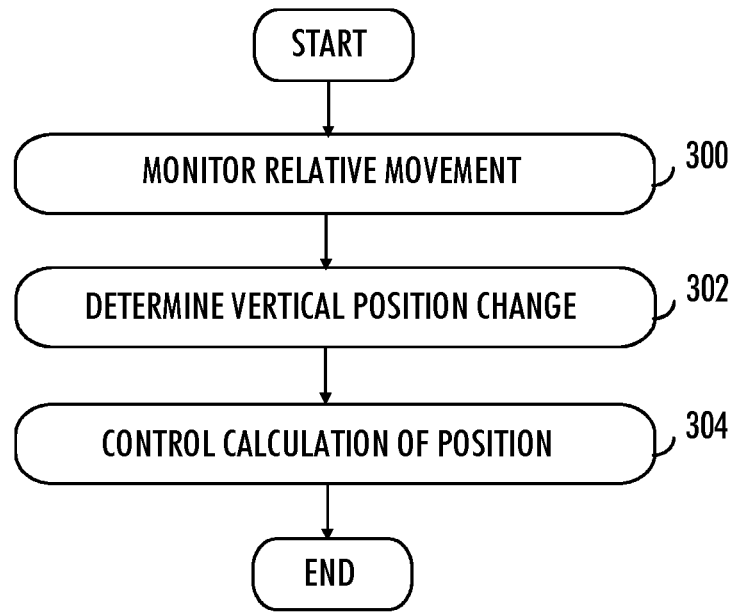
FIGS. 3, 4 and 5 are flowcharts illustrating some embodiments.

The flowchart of FIG. 3 illustrates an embodiment. The flowchart illustrates an example of the operation of an apparatus. In an embodiment, the apparatus may be a terminal device, user equipment, a part of a terminal device or any other apparatus capable of executing following steps.

In step 300, the apparatus is configured to monitor relative vertical movement of the apparatus utilising repeated readings of a barometric sensor.

In step 302, the apparatus is configured to compare monitored relative movement to a given threshold and determine whether the vertical position of the apparatus is changed or unchanged based on the comparison.

In step 304, the apparatus is configured to control calculation of the position of the apparatus based on the determination.

In the proposed solution, the relative accuracy achievable with barometric sensors is utilised to determine whether the terminal device is moving or not. If the terminal device is not moving in vertical direction, the measurement results of cellular positioning may be accumulated and combined, thus achieving better accuracy than in one shot measurements. The actual cellular positioning measurements may be performed in the terminal device or in a network element.

It may be noted that actual barometric pressure is not calculated. Only differences between results of successive measurements are monitored. Relative pressure sensor measurements are utilised to confirm unchanged vertical position of a terminal device and by that enable calculation of an improved vertical accuracy constant pressure filtered positioning estimate.

In an embodiment, relative vertical movement of the apparatus is monitored by reading the value given by the barometric sensor at different time instants and calculating the absolute difference of the values. The relative vertical movement is determined based on the absolute difference.

Figure 4:
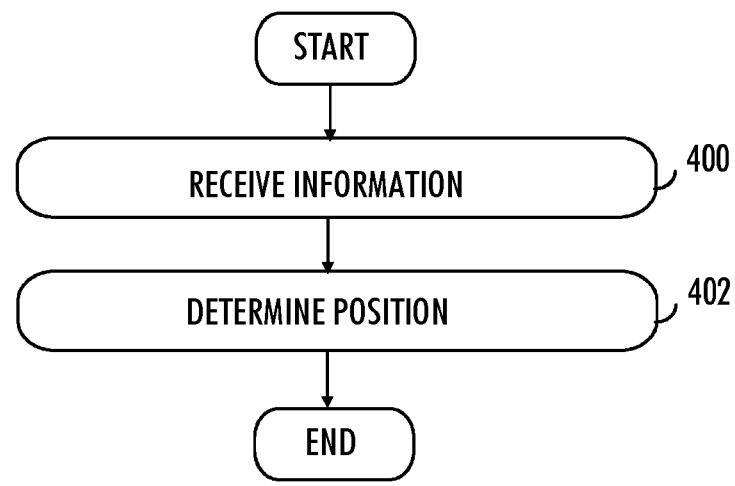

The flowchart of FIG. 4 illustrates an embodiment. The flowchart illustrates an example of the operation of an apparatus. In an embodiment, the apparatus may be a network element, a part of a network element or any other apparatus capable of executing following steps. In an embodiment, the apparatus may be a location management function, LMF, of a network, In step 400, the apparatus is configured to receive from a terminal device information on the vertical position of the terminal device.

In step 402, the apparatus is configured to perform and accumulate cellular positioning measurements regarding the terminal device, if the received information indicates the vertical position of the terminal device is unchanged and when a given number of measurements have been made determine the position of the terminal device.

Figure 5:
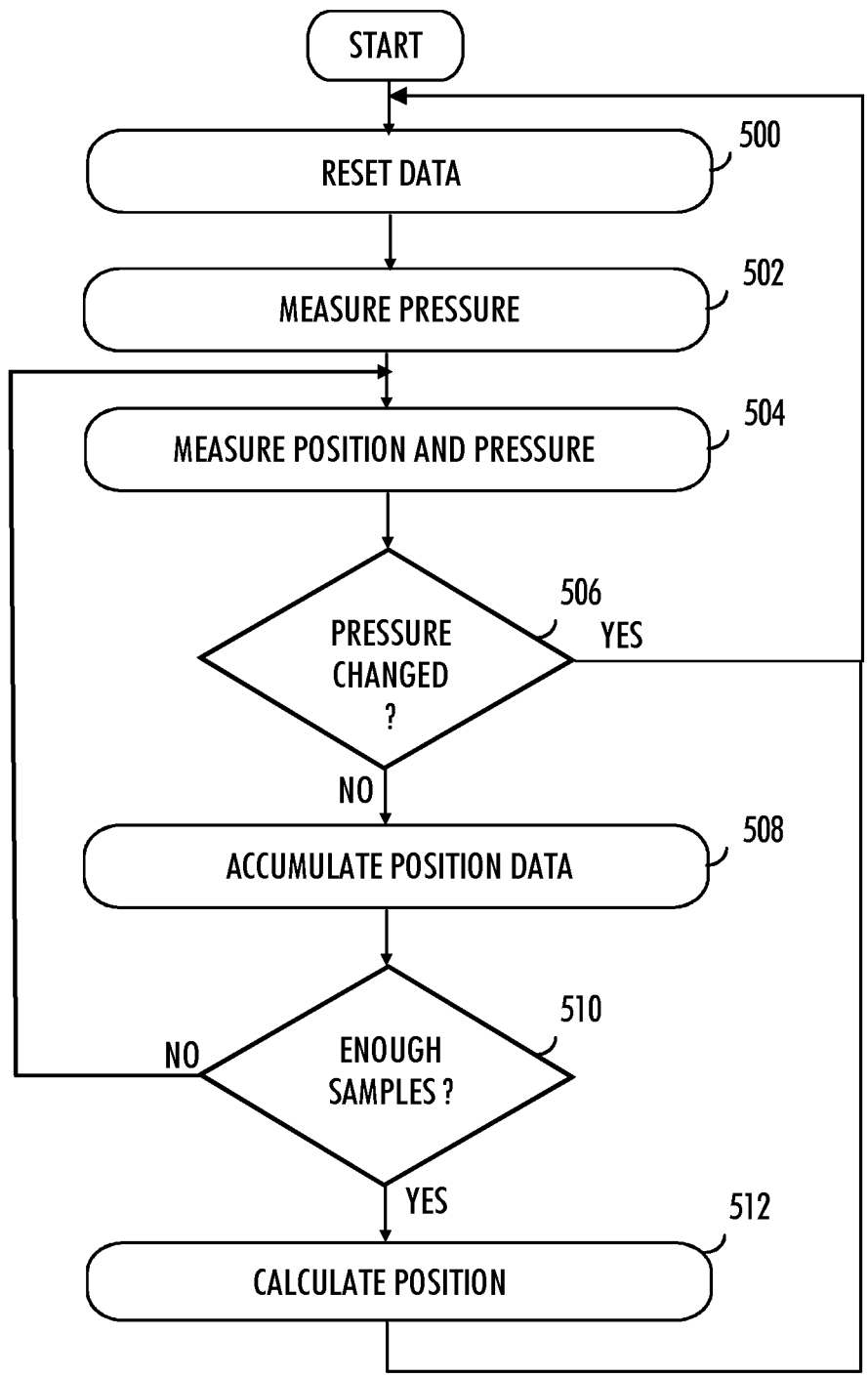

The flowchart of FIG. 5 illustrates an embodiment. The flowchart illustrates an example of the operation of an apparatus. In an embodiment, the apparatus may be a terminal device, user equipment, a part of a terminal device or any other apparatus capable of executing following steps. The flowchart illustrates an example of the operation of the apparatus of FIG. 3 in more detail.

In this embodiment, cellular positioning measurements are performed by the terminal device.

In step 500, the apparatus is configured to reset cellular positioning measurement samples. The values of the cellular positioning measurement samples are nulled and set a counter N to zero.

In step 502, the apparatus is configured to read barometer sensor to obtain a reference value $P_0$.

In step 504, the apparatus is configured to obtain cellular positioning measurement samples to obtain position estimate (x(N), y(N), z(N)) and to read barometer sensor to obtain a value $P_N$.

In step 506, the apparatus is configured to calculating the absolute difference of the values $P_d=|P_N-P_0|$ and compare the difference $P_d$ to a threshold h.

If $P_d>h$, i.e. the difference is greater than the threshold, the apparatus has moved significantly in vertical direction and the operation continues in step 500.

If $P_d \le h$, i.e. the difference is smaller or equal than the threshold, the apparatus has not moved significantly in vertical direction and the cellular positioning measurement process may continue.

In step 508, the apparatus is configured to accumulate the measurement samples made in step 504 with previous measurements and increase counter N by one.

In step 510, the apparatus is configured to determine if there are enough measurement samples for determining accurate position of the apparatus. The apparatus may compare the counter N to a predetermined threshold value H. If N<H the process of collecting more measurement samples continues instep 504.

Otherwise, the apparatus is configured to calculate the position of the apparatus in step 512.

The process may then start again in step 500.

Embodiments of the invention enable high positioning accuracy in vertical direction also if the user is a moving user. Barometric pressure sensors are typically used only for relative measurements since these types of sensors are more accurate for such measurements. As barometric pressure sensors are typically already implemented in terminal devices, the sensors do not add any extra costs. Further, any additional calibration is not needed as the sensors have already required accuracy.

With the proposed solution, it is possible to achieve positioning accuracy within one meter. In addition, the achieved accuracy is better that what is required by mobile devices by Federal Communications Commission, FCC, for enhanced 911 purposes, for example.

In an embodiment, the proposed solution is used to obtain accurate position of the terminal device in vertical direction (z). In an embodiment, the position may be determined accurately in all directions (x,y,z).

Figure 6:
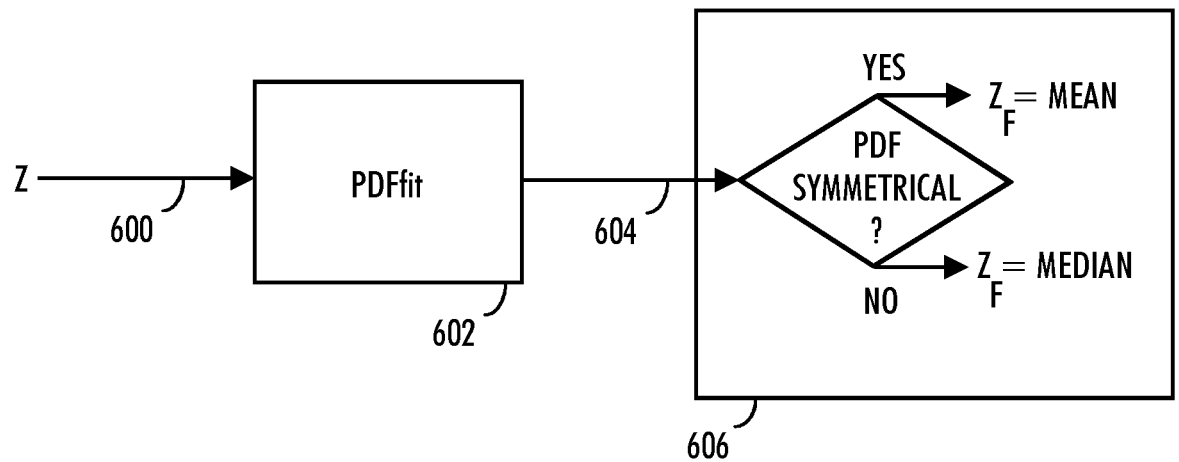
FIG. 6 illustrates an example of calculating vertical position.

In an embodiment, an accurate vertical position of the apparatus may be determined in step 512 utilising the obtained cellular positioning measurement samples Z= $\{z_1, \ldots, z_N\}$. This is illustrated in FIG. 6.

The set Z 600 may be provided as an input to a probability density function, PDF, fitting algorithm calculator 602. Examples of suitable algorithms are parametric or regression methods or L-moments, abbreviated as PDFfit.

The output of PDFfit, comprising the empirical PDF of data in Z, is provided as an input 604 to a Central Tendency Determination block 606 that computes the floor estimation as either the mean or the median of the resulting PDF, for example. Other higher order moments may be used as well. The selection of mean versus median depends on the skewness of the PDF: for a symmetrical PDF, the block 606 provides the mean as the output ZF, while for an asymmetrical one, the block 606 provides the median as the output ZF.

Figure 7:
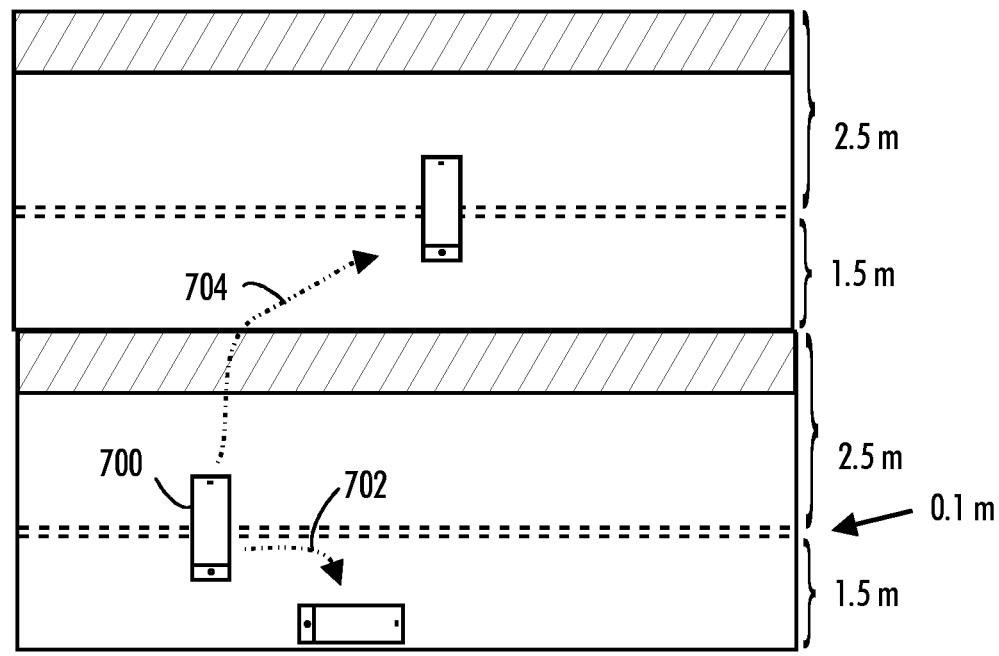
FIG. 7 illustrates an embodiment.

FIG. 7 illustrates an example where the terminal device apparatus is defined to be in a building comprising several floors.

In the example of FIG. 7, the floor separation is 4 meters, and a relative pressure sensor accuracy of terminal device barometric sensor is ±10 cm. On a given floor the terminal device is likely vertically located anywhere from directly at the floor up to table/carry height, here shown as 1.5 m above the floor.

In an embodiment, if the pressure difference $P_d$ denotes vertical difference below 0.2 m, it is assumed that the terminal device has not moved and accumulating cellular positioning samples can continue. If the pressure difference $P_d$ denotes vertical difference above 0.2 m accumulating the cellular positioning samples is interrupted, the values obtained using cellular positioning measurements are reset and accumulating the measurements is resumed from start.

In an embodiment, if only floor identification is required the pressure delta threshold may set higher than 0.2 m, for example to 1.7 m, to absorb in-floor vertical movements. Let us assume that this is the case in following.

In the example of FIG. 7, a terminal device 700 is located at table/carry height. Then the terminal device drops 702 to the floor. The pressure difference $P_d$ denotes vertical difference above 0.2 m but below 1.7 m, thus it is assumed that it stays on the same floor. After the terminal device has been picked up, it moves 704 to a new location. This time the pressure difference $P_d$ denotes vertical difference above 1.7 m, and it may be assumed that a floor has been changed. Now accumulating the cellular positioning samples is interrupted, the values obtained using cellular positioning measurements are reset and accumulating the measurements is resumed from start.

Figure 8:
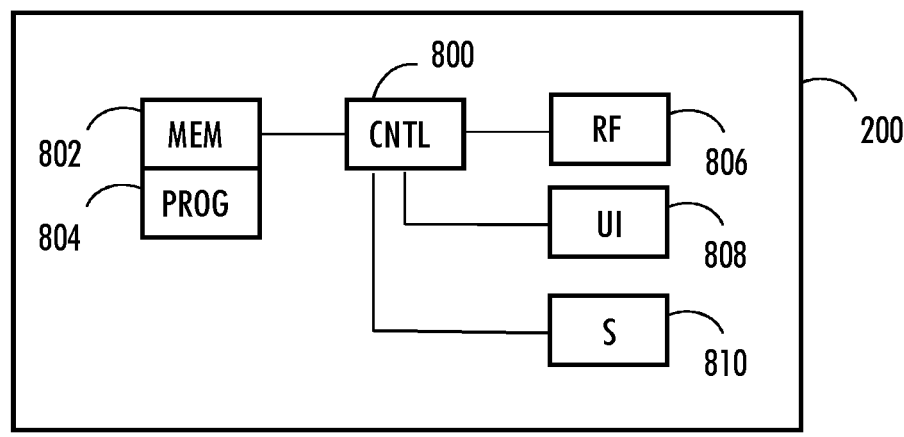
FIGS. 8 and 9 illustrate examples of apparatuses.

FIG. 8 illustrates an embodiment. The figure illustrates a simplified example of an apparatus applying embodiments of the invention. In some embodiments, the apparatus may be a terminal device 200, or a part of a terminal device of a telecommunication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 200 of the example includes a control circuitry 800 configured to control at least part of the operation of the apparatus.

The apparatus may comprise a memory 802 for storing data. Furthermore, the memory may store software 804 executable by the control circuitry 800. The memory may be integrated in the control circuitry.

The apparatus may comprise one or more interface circuitries 806. The interface circuitries are operationally connected to the control circuitry 800. An interface circuitry 806 may be a set of transceivers configured to communicate with a RAN node, such as an (e/g)NodeB of a wireless communication network, or communicate utilising sidelink communication with a terminal device. The interface circuitry may be connected to an antenna arrangement (not shown). The apparatus may also comprise a connection to a transmitter instead of a transceiver. The apparatus may further comprise a user interface 808.

The apparatus comprises one or more barometric sensors 810 and other sensors.

In an embodiment, the software 804 may comprise a computer program comprising program code means adapted to cause the control circuitry 800 of the apparatus to realise at least some of the embodiments described above.

Figure 9:
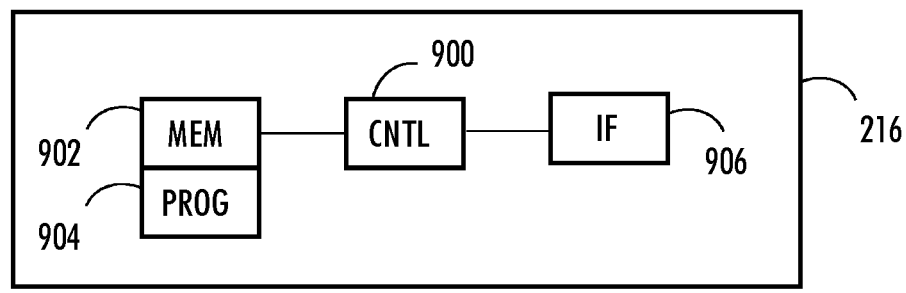

FIG. 9 illustrates an embodiment. The figure illustrates a simplified example of an apparatus applying embodiments of the invention. In some embodiments, the apparatus may be a network element such as a location management function, LMF 216, or a part of an LMF of a telecommunication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 216 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906. The interface circuitries are operationally connected to the control circuitry 900. An interface circuitry 906 may provide a wired or wireless connection to other network elements of the telecommunication system.

In an embodiment, the software 904 may comprise a computer program comprising program code means adapted to cause the control circuitry 900 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute at least the following: monitoring relative vertical movement of the apparatus utilising repeated readings of a barometric sensor; comparing monitored relative movement to a given threshold and determining whether the vertical position of the apparatus is changed or unchanged based on the comparison; controlling calculation of the position of the apparatus based on the determination.

An embodiment provides a non-transitory computer readable medium comprising program instructions for causing an apparatus to perform at least the following: monitoring relative vertical movement of the apparatus utilising repeated readings of a barometric sensor; comparing monitored relative movement to a given threshold and determining whether the vertical position of the apparatus is changed or unchanged based on the comparison; controlling calculation of the position of the apparatus based on the determination.

An embodiment provides a computer readable medium comprising program instructions for causing an apparatus to perform at least the following: monitoring relative vertical movement of the apparatus utilising repeated readings of a barometric sensor; comparing monitored relative movement to a given threshold and determining whether the vertical position of the apparatus is changed or unchanged based on the comparison; controlling calculation of the position of the apparatus based on the determination.

An embodiment provides a computer program embodied on a distribution medium, comprising program instructions which, when loaded into an electronic apparatus, are configured to control the apparatus to execute at least the following: receiving from a terminal device information on the vertical position of the terminal device; performing and accumulating cellular positioning measurements regarding the terminal device, if the received information indicates the vertical position of the terminal device is unchanged and when a given number of measurements have been made determine the position of the terminal device.

An embodiment provides a non-transitory computer readable medium comprising program instructions for causing an apparatus to perform at least the following: receiving from a terminal device information on the vertical position of the terminal device; performing and accumulating cellular positioning measurements regarding the terminal device, if the received information indicates the vertical position of the terminal device is unchanged and when a given number of measurements have been made determine the position of the terminal device.

An embodiment provides a computer readable medium comprising program instructions for causing an apparatus to perform at least the following: receiving from a terminal device information on the vertical position of the terminal device; performing and accumulating cellular positioning measurements regarding the terminal device, if the received information indicates the vertical position of the terminal device is unchanged and when a given number of measurements have been made determine the position of the terminal device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system comprising:
at least one processor; and at least one memory storing instructions that, when executed by the at least one processor, cause the apparatus to:
monitor relative vertical movement of the apparatus utilizing repeated readings of a barometric sensor;
compare monitored relative movement to a given threshold and determine whether a vertical position of the apparatus is changed or unchanged based on the comparison;
based on a determination that the vertical position of the apparatus is unchanged, perform and combine cellular positioning measurements and responsive to a number of measurements that have been made satisfying a predetermined threshold, determine the position of the apparatus at least in a vertical direction; and
based on a determination that the vertical position of the apparatus is changed, interrupt combining of cellular positioning measurements, reset values obtained using cellular positioning measurements, and resume combining the measurements.

2. The apparatus of claim 1, wherein the vertical position of the apparatus is determined to be unchanged responsive to the vertical movement of the apparatus, determined using the readings of a barometric sensor, comprising a value smaller than the given threshold.

3. The apparatus of claim 1, wherein determine that the vertical position of the apparatus is determined to be changed responsive to the vertical movement of the apparatus, determined using the readings of a barometric sensor, comprising a value larger than the given threshold.

4. The apparatus of claim 3 further configured to:
increase periodicity of cellular positioning measurements after resuming combining of the measurements.

5. The apparatus of claim 1 further configured to:
indicate the determination of the vertical position of the apparatus to a network element calculating the position of the apparatus.

6. The apparatus of claim 1 further configured to:
monitor relative vertical movement of the apparatus by reading the value given by the barometric sensor at different time instants and calculating the absolute difference of the values; and
determine the relative vertical movement based on the absolute difference.

7. An apparatus in a network element of a communication system comprising:
at least one processor; and at least one memory storing instructions that, when executed by the at least one processor, cause the apparatus to:
receive from a terminal device information on a vertical position of the terminal device; and
perform cellular positioning measurements regarding the terminal device;
responsive to the received information received from the terminal device and the cellular positioning measurements indicating that the vertical position of the terminal device is unchanged, combine cellular positioning measurements associated with the terminal device; and
responsive to a number of times that the cellular positioning measurements have been combined satisfying a predetermined threshold, determine a position of the terminal device at least in a vertical direction.

8. The apparatus of claim 7 further configured to:
interrupt the combining of cellular positioning measurements, reset values obtained using cellular positioning measurements, and resume combining the measurements responsive to the received information indicating the vertical position of the terminal device is changed.

9. A method in an apparatus of a communication system, comprising:
monitoring relative vertical movement of the apparatus utilizing repeated readings of a barometric sensor;
comparing monitored relative movement to a given threshold and determining whether a vertical position of the apparatus is changed or unchanged based on the comparison;
based on a determination that the vertical position of the apparatus is unchanged, performing and combining cellular positioning measurements and responsive to a number of measurements that have been made satisfying a predetermined threshold, determining the position of the apparatus at least in a vertical direction; and
based on a determination that the vertical position of the apparatus is changed, interrupting the combining of cellular positioning measurements, resetting values obtained using cellular positioning measurements, and resuming combining the measurements.

10. The method of claim 9, wherein the vertical position of the apparatus is determined to be unchanged responsive to the vertical movement of the apparatus determined using the readings of a barometric sensor, comprising a value smaller than the given threshold.

11. The method of claim 9, further comprising:
indicating the determination of the vertical position of the apparatus to a network element calculating the position of the apparatus.

12. The method of claim 9, wherein the vertical position of the apparatus is determined to be changed responsive to the vertical movement of the apparatus determined using the readings of a barometric sensor, comprising a value larger than the given threshold.

13. The method of claim 12 further comprising:
increasing periodicity of cellular positioning measurements after resuming combining of the measurements.

14. The method of claim 9 further comprising:
monitoring relative vertical movement of the apparatus by reading the value given by the barometric sensor at different time instants and calculating the absolute difference of the values; and
determining the relative vertical movement based on the absolute difference.

15. A non-transitory computer readable medium comprising program instructions that, when executed by an apparatus, cause the apparatus to perform at least the following:
monitoring relative vertical movement of the apparatus utilizing repeated readings of a barometric sensor;
comparing monitored relative movement to a given threshold and determining whether a vertical position of the apparatus is changed or unchanged based on the comparison;
based on a determination that the vertical position of the apparatus is unchanged, performing and combining cellular positioning measurements and responsive to a number of measurements that have been made satisfying a predetermined threshold, determining the position of the apparatus at least in a vertical direction; and
based on a determination that the vertical position of the apparatus is changed, interrupting the combining of cellular positioning measurements, resetting values obtained using cellular positioning measurements, and resuming combining the measurements.

16. The non-transitory computer readable medium of claim 15, wherein the vertical position of the apparatus is determined to be changed responsive to the vertical movement of the apparatus determined using the readings of a barometric sensor, comprising a value larger than the given threshold.

17. The non-transitory computer readable medium of claim 16 further comprising program instructions that, when executed by the apparatus, cause the apparatus to perform:
increasing periodicity of cellular positioning measurements after resuming combining of the measurements.

18. The non-transitory computer readable medium of claim 15 further comprising program instructions that, when executed by the apparatus, cause the apparatus to perform:
monitoring relative vertical movement of the apparatus by reading the value given by the barometric sensor at different time instants and calculating the absolute difference of the values; and
determining the relative vertical movement based on the absolute difference.

* * * * *